Patented May 31, 1938

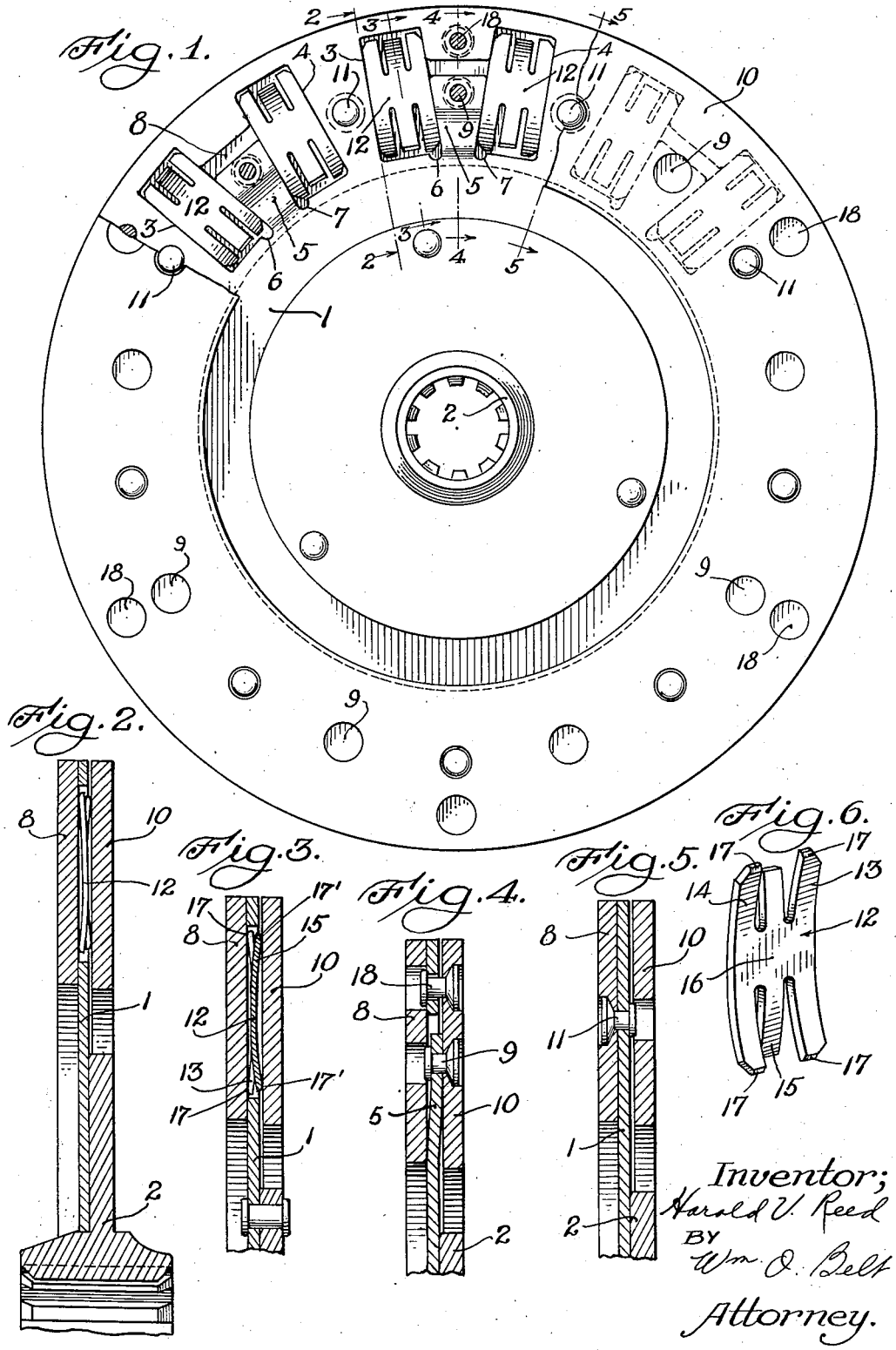

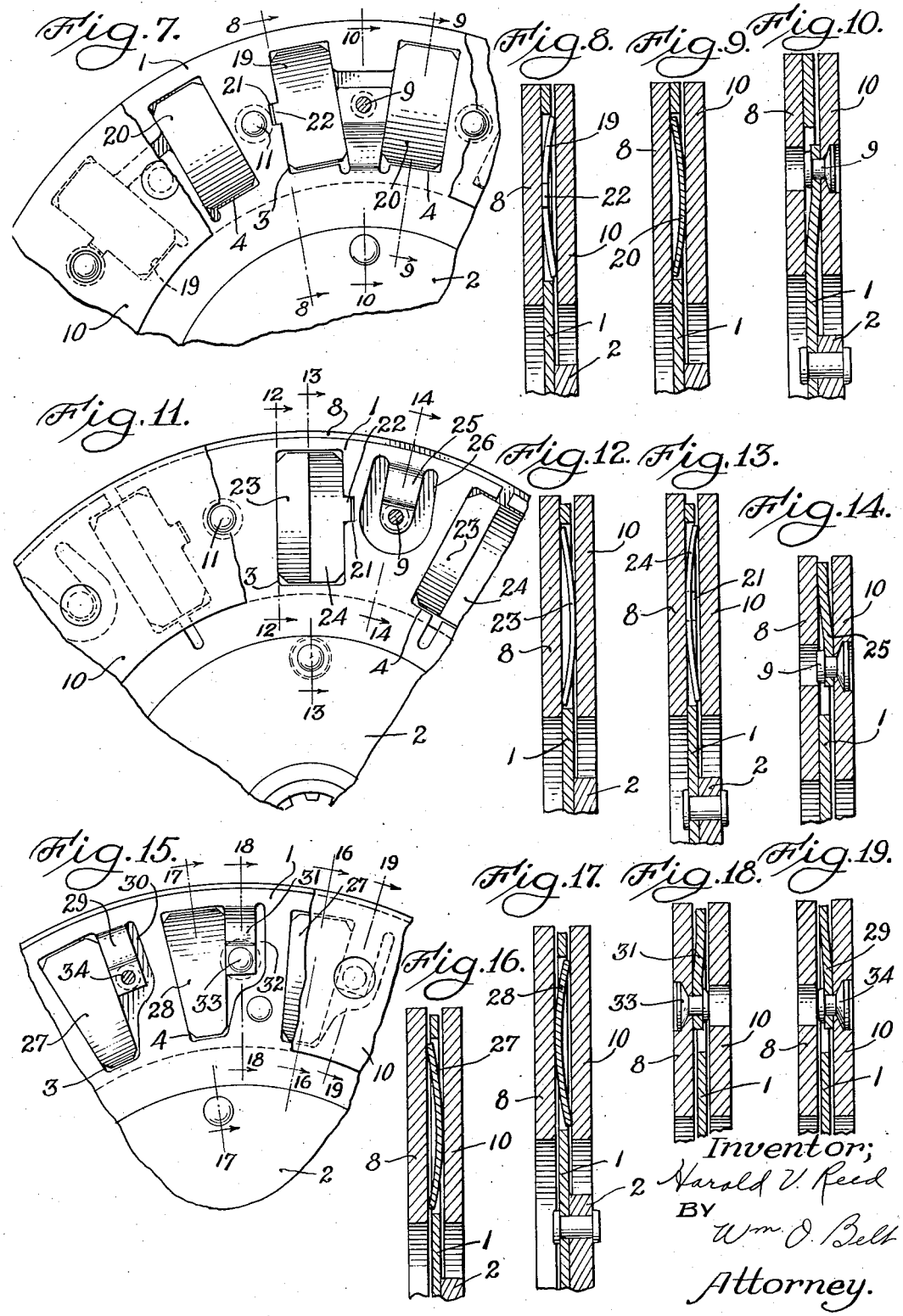

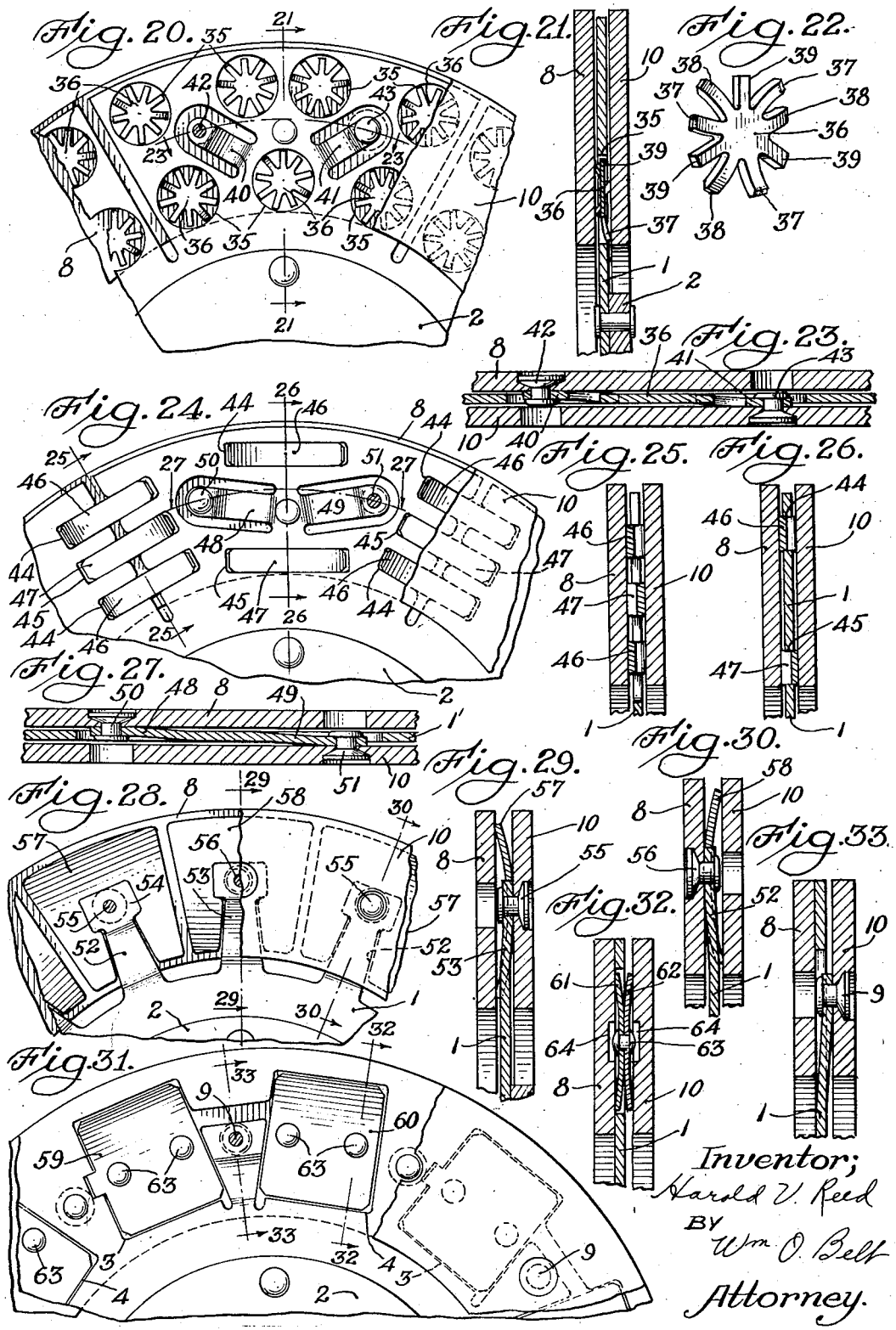

2,119,025

UNITED STATES PATENT OFFICE 2,119,025

CLUTCH PLATE

Harold V. Reed, Chicago, Ill., assignor to Borg-Warner Corporation, Chicago, Ill., a corporation of Illinois Application January 30, 1935, Serial No. 4,046

20 Claims. (Cl. 192—107)

This invention relates to friction clutches for automotive vehicles and it may also be used in other friction clutches for which it is or may be adapted.

Clutch plates have heretofore been made in various forms and they usually comprise a metal disc made fast to the driven member, and friction facings secured to the disc on opposite sides thereof adjacent the periphery of the disc and adapted to be located between the clamping parts of the driving member. In some types of clutch plates the friction facings have been fastened to the disc by rivets which hold the facings to tongues struck from the plane of the disc. The facings have been spaced from the disc by the offset provided in the tongues and while a certain amount of cushioning is afforded the facings by the tongues in engagement of the clutch the cushion is necessarily weak and insufficient to fulfill the requirements of the present day clutches. It has therefore been found desirable to provide radial slots between the tongues to form sectors in the peripheral portion of the disc which have been bent to offset parts thereof on one or both sides of the disc to form a substantial cushion for the facings in the engagement of the clutch. In other types of clutch plates tongues have not been provided and, instead of sectors being formed, openings have been made in the clutch plate between the rivets and separate cushion members have been inserted in the openings to provide the cushion for the facings. The latter construction has enabled the use of cushion members of a different or higher grade material than that used in the disc and, too, it has not been necessary to pass rivets or other fastening means through the cushion members which would distort them. The separate cushion members can be made with greater accuracy in thickness and curvature and within smaller tolerances than when a part of the disc is used to cushion the facings. However, clutch plates have not been made heretofore with separate cushion members and with the facings parallel to each other and to the disc so that complete and full contact of cushioned facings is obtained upon initial engagement of the clutch. Complete and full contact upon initial engagement is desirable so that the facings will not wear in spots but will wear uniformly throughout their extent. Where separate cushion members have been used the facings have been held tightly to the disc by the rivets between the cushion members and the facings have bulged from the disc where they engage the cushion members. This produces initial contact, in engagement of the clutch, only at those parts of the facings bulged from the disc, and this contact has increased with the pressure until the facings have been completely flattened to lie in a plane. The greatest wear on facings of this type of clutch plate has been at the parts of the facings bulged from the disc while much less wear has taken place on the facings at the parts held tight against the disc by the rivets. Unequal wear of the facings has resulted and the life of the facings has been correspondingly reduced.

The primary object of this invention is to provide full and complete contact of a friction facing cushioned by separate cushion members in a clutch plate, throughout engagement of the clutch.

Another object is to provide uniform wear throughout the extent of a friction facing cushioned in the engagement of the clutch by separate cushion members.

A further object is to provide separate cushion members to cushion the facing during engagement of the clutch without causing unequal wear or wear in spots as distinguished from uniform wear throughout the extent of the facing.

A still further object is to provide a single disc type of clutch plate with separate cushion members arranged in openings in the disc between the facings which are spaced from the disc throughout their extent by tongues struck from the disc between the openings and are parallel to each other and to the disc, so that full and complete contact is made by the facings with the parts of the driving member of the clutch throughout the engagement of the clutch and the engagement is cushioned to avoid grabbing and chattering.

In the accompanying drawings illustrating the invention—

Fig. 1 is a plan view of a clutch plate showing one facing partly broken away;

Fig. 2 is a sectional view on the line 2—2 of Fig. 1;

Fig. 3 is a sectional view on the line 3—3 of Fig. 1;

Fig. 4 is a sectional view on the line 4—4 of Fig. 1;

Fig. 5 is a sectional view on the line 5—5 of Fig. 1;

Fig. 6 is a detail perspective view of one of the cushion members shown in Fig. 1;

Fig. 7 is a fragmentary plan view of another form of the invention showing one of the friction facings partly broken away;

Fig. 8 is a sectional view on the line 8—8 of Fig. 7;

Fig. 9 is a sectional view on the line 9—9 of Fig. 7;

Fig. 10 is a sectional view on the line 10—10 of Fig. 7;

Fig. 11 is a fragmentary plan view of another form of the invention showing one friction facing partly broken away;

Fig. 12 is a sectional view on the line 12—12 of Fig. 11;

Fig. 13 is a sectional view on the line 13—13 of Fig. 11;

Fig. 14 is a sectional view on the line 14—14 of Fig. 11;

Fig. 15 is a fragmentary plan view of another form of the invention showing one friction facing partly broken away;

Fig. 16 is a sectional view on the line 16—16 of Fig. 15;

Fig. 17 is a sectional view on the line 17—17 of Fig. 15;

Fig. 18 is a sectional view on the line 18—18 of Fig. 15;

Fig. 19 is a sectional view on the line 19—19 of Fig. 15;

Fig. 20 is a fragmentary plan view of another form of the invention showing one friction facing partly broken away;

Fig. 21 is a sectional view on the line 21—21 of Fig. 20;

Fig. 22 is a detail perspective view of the cushion member shown in Fig. 20;

Fig. 23 is a sectional view on the line 23—23 of Fig. 20;

Fig. 24 is a fragmentary plan view of another form of the invention showing one friction facing partly broken away;

Fig. 25 is a sectional view on the line 25—25 of Fig. 24;

Fig. 26 is a sectional view on the line 26—26 of Fig. 24;

Fig. 27 is a sectional view on the line 27—27 of Fig. 24;

Fig. 28 is a fragmentary plan view of another form of the invention showing one friction facing partly broken away;

Fig. 29 is a sectional view on the line 29—29 of Fig. 28;

Fig. 30 is a sectional view on the line 30—30 of Fig. 28;

Fig. 31 is a fragmentary plan view of another embodiment of the invention showing one friction facing partly broken away;

Fig. 32 is a sectional view on the line 32—32 of Fig. 31; and

Fig. 33 is a sectional view on the line 33—33 of Fig. 31.

Referring to Figs. 1-6 of the drawings, the type of clutch plate shown comprises a disc 1 secured to a hub member 2 which is splined to be received on a splined driven shaft in an automotive vehicle. Pairs of radially extending openings 3, 4 are provided in the peripheral portion of the disc and tongues 5 are formed between the openings of each pair. The tongues are bent from the plane of the disc and are offset on one side thereof. The edges of the disc are notched at 6, 7 where the tongues connect with the body of the disc, to lengthen the tongues and increase the flexibility thereof. One facing 10 is fastened to the tongues by rivets 9 on one side of the disc, and another facing 8 is fastened directly to the peripheral portion of the disc by rivets 11 between adjacent pairs of openings and on the opposite side of the disc. Cushion members 12 are mounted in the openings 3, 4 separate from the disc and independent of each other. The cushion member comprises arcuate side portions 13, 14 curved in the same direction and an arcuate middle portion 15 curved in the opposite direction and all of the portions are connected at the center of the member at 16. The side portions 13, 14 are slightly longer than the middle portion 15, Figs. 3, 6, and the ends of the side portions are flattened at 17 to bear against the facing 10 without digging into the facing during operation of the clutch. The ends of the side portions of the cushion members are engageable with the peripheral portion of the disc at the ends of the openings 3, 4 in the disc to hold the cushion members in place in the openings. The ends of the middle portion 15 are flattened at 17' similar to the flattened ends 17 of the side portions 13, 14 and for the same purpose. Limiting rivets 18, Figs. 1, 4, are provided in the clutch plate to limit the amount of spread between the facings caused by the cushion members 12. The rivets 18 prevent the facing 8 when in normal position from being spaced from the disc a distance equal to or greater than the thickness of the cushion member. The cushion members therefore are wholly confined within the openings 3, 4 and between the facings 8 and 10.

In the embodiment shown in Figs. 7-10, the cushion members are not divided into side portions and middle portions but comprise solid spring plates. The cushion member 19 is curved in one direction and the cushion member 20 of the same pair is curved in the opposite direction. The disc is notched at 21 at the middle of the radially extending opening 3 to receive a projecting lug 22 on one side of the cushion member 19 at the middle thereof. The cushion member 20 will be held in place in the radially extending opening 4 because the ends thereof are located in the opening at the ends thereof and the centrifugal force of the clutch plate will tend to throw the cushion member 20 against the outer end of the opening 4, Fig. 9. The cushion member 19 might wedge in the space between the facing 10 and the extreme peripheral portion of the disc were it not for the lug 22 which engages the sides of the notch 21 to hold the cushion member within the opening 3 at all times.

In Figs. 11-14 there are two separate cushion members 23, 24 in each radially extending opening 3, 4. The cushion member 23 is held in the openings 3, 4 in the same manner in which the cushion member 20 is held in the opening 4, Fig. 9, and the cushion member 24 has a lug 22 projecting into a notch 21, similar to the lug 22 and notch 21 of Fig. 7, to hold the cushion member 24 in place in the openings 3, 4. In this embodiment tongues 25 are formed by U-shaped slots 26 between the openings 3, 4 and are bent from the body of the disc in the same manner as the tongues 5 are bent and rivets 9 fasten the facings 10 to the tongues.

Cushion members 27, Figs. 15-19, in the radially extending openings 3 are bent in one direction and cushion members 28 in the radially extending openings 4 are bent in the opposite direction. Tongues 29 are formed by the openings 3 and L-shaped slots 30 and are bent from the body of the disc on one side thereof, and the tongues 31 are formed by the openings 4 and L-shaped slots 32 and are bent from the opposite side of the disc. The facing 8 is fastened to the tongues 31 by rivets 33 and the facing 10 is fastened to the tongues 29 by rivets 34. Both of the facings are spaced from the disc a distance less than the thickness of the cushion members 27, 28 so that the cushion members are held in their respective openings without being thrown out by the centrifugal force of the clutch plate.

In the embodiment shown in Figs. 20–23, a plurality of circular openings 35 are provided in the peripheral portion of the disc between the facings 8 and 10. Cushion members 36 comprise a plurality of spokes 37, 38 and 39 projecting from a body portion. Spokes 37 are bent to one side of the plane of the body portion, spokes 38 are bent to the opposite side of the plane of the body portion and spokes 39 lie within the plane of the body portion. The spokes 39 position the cushion member centrally in the openings 35 and the ends of the spokes 37, 38 engage opposite facings. Tongues 40, 41 are formed by substantially U-shaped slots and are bent to opposite sides of the body of the disc. The facing 8 is fastened to the tongues 40 by rivets 42 and the facing 10 is fastened to the tongues 41 by rivets 43. In this embodiment both of the facings are spaced from the disc by the tongues and cushion members.

In Figs. 24–27 substantially circumferential openings 44, 45 are provided in the peripheral portion of the disc between the facings 8 and 10 and receive cushion members 46, 47, respectively. The cushion members 46 are bent in one direction and the cushion members 47 are bent in the opposite direction. Tongues 48, 49, similar to tongues 40, 41 of Fig. 20, are formed by substantially U-shaped slots in the peripheral portion of the disc. The tongues 48 are bent to one side of the disc and the tongues 49 are bent to the opposite side. Rivets 50 fasten the facing 8 to the tongues 48 and rivets 51 fasten the facing 10 to the tongues 49. In this embodiment the facings are spaced from the disc a distance less than the thickness of the cushion members 46, 47 thereby holding the cushion members in place in their respective openings.

The disc, Figs. 28–30, has radially extending tongues 52, 53 extending therefrom which tongues have enlarged heads 54 at the outer end thereof. The tongues lie between the friction facings 8 and 10 with the heads thereof substantially midway between the inside and outside diameter of the facings. The tongues 52 are bent to one side of the plane of the disc and the tongues 53 are bent to the opposite side of the plane of the disc. Rivets 55 fasten the facing 10 to the enlarged heads 54 of the tongues 52, and rivets 56 fasten the facing 8 to the enlarged heads 54 of the tongues 53. Cushion members 57, 58 surround the heads 54 of the tongues 52, 53, respectively, and extend down alongside of the respective tongues. The cushion members 57 are bent in one direction and the cushion members 58 are bent in the opposite direction. The ends of the cushion members 57 engage the facing 8 and the central portions of the cushion members 57 engage the facing 10 while the ends of the cushion members 58 engage the facing 10 and the central portions of the cushion members 58 engage the facing 8. The facings are spaced from the disc a distance less than the thickness of the cushion members 57, 58, and the cushion members are held in place against the centrifugal force of the clutch plate by the interlocking engagement with the heads of the tongues.

In Figs. 31–33 the disc and tongues are of substantially the same construction as that shown in Figs. 7–10 but the cushion members 59, 60 are each composed of two parts 61, 62. The parts 61 are curved in one direction and the parts 62 are curved in the opposite direction and the central portions of the parts are fastened together by rivets 63 to form a double cushion. The facings are recessed at 64 to receive the heads of the rivets when the clutch is in engagement. The parts 61 have their ends within the openings 3, 4 to hold the cushion member in place in the openings.

My invention provides a highly efficient cushion clutch plate wherein tongues are employed to maintain the facings in parallelism and separate cushion members provide yielding engagement for the clutch plate. Whether one or both facings are yieldingly mounted on the tongues the facings will always be maintained in parallelism so that they will make full and complete contact throughout engagement of the clutch. By making the cushion members separate from the disc a higher grade of material than is required in the disc may be used. The full contact of the facings throughout engagement of the clutch not only provides a superior clutching effect but it protects the facings against uneven wear and prolongs the life of the facings by giving maximum and uniform wear. The use of higher grade material in the cushion members than is required in the disc enables these members to be made with more uniform accuracy and this also contributes to the superior clutching effect and to prolongation of the life of the facings.

While I have shown and described the invention in a particular type of clutch plate and in particular forms, I do not mean thereby to restrict the invention to the embodiments illustrated nor to the type of clutch plate shown for it can be employed in many different embodiments and kinds of clutches and clutch plates with satisfactory results; and therefore I reserve the right to use the invention in any form and for any purpose for which it is or may be adapted within the scope of the following claims:

I claim:

1. A clutch plate comprising a disc having openings in the peripheral portion thereof, friction facings arranged adjacent the openings and on opposite sides of the disc, separate cushion members arranged in the openings, tongues in the peripheral portion of the disc and offset on at least one side thereof and between the facings, and means fastening at least one facing to the tongues.

2. A clutch plate comprising a disc having openings in the peripheral portion thereof, parallel friction facings arranged adjacent the openings and on opposite sides of the disc, separate cushion members arranged in the openings, tongues in the peripheral portion of the disc and offset on at least one side thereof and between the facings, and means fastening at least one facing to the tongues.

3. A clutch plate comprising a disc having openings in the peripheral portion thereof, a pair of friction facings parallel to each other and to the disc and arranged over the openings and on opposite sides of the disc, separate cushion members in the openings, tongues in the peripheral portion of the disc and offset on at least one side thereof between the facings, and means fastening at least one facing to the tongues.

4. A clutch plate comprising a disc, tongues in the peripheral portion of the disc and offset on at least one side of the plane thereof, a friction facing yieldably spaced from the disc and arranged on said one side of the peripheral portion and parallel thereto for full contact throughout engagement of the clutch, means fastening the facing to the tongues, a second friction facing secured to the disc on the opposite side thereof, separate cushion members for the first named facing to cushion the engagement of the clutch, and means limiting the spacing of the facing from the disc to a distance less than the thickness of the extended cushion members.

5. A clutch plate comprising a disc, a pair of friction facings parallel to each other and to the peripheral portion of the disc and arranged on opposite sides of the peripheral portion, separate cushion members arranged between the facings and in each of a plurality of pairs of openings in the peripheral portion of the disc to cushion the engagement of the clutch, and a tongue between the openings of each pair and forming a wall of at least one opening and offset from the plane of the disc to space at least one of the facings from the disc.

6. A clutch plate comprising a disc of relatively thick sheet metal having openings in the peripheral portion thereof, friction facings arranged adjacent the openings and on opposite sides of the disc, separate cushion members of relatively thin sheet steel arranged in the openings, and tongues in the peripheral portion adjacent the openings and between the facings, the disc being notched at the corner of the openings adjacent the tongues to increase the resiliency of the tongues.

7. A clutch plate comprising a disc, a pair of friction facings parallel to each other and to the peripheral portion of the disc and arranged on opposite sides thereof, and separate cushion members arranged between the facings and in each of a plurality of openings in the peripheral portion to cushion the engagement of the clutch, said cushion members comprising oppositely curved portions, the portions curved in one direction being longer than the portions curved in the other direction with the ends of the longer curved portions engageable with the peripheral portion at the ends of the openings to hold said cushion members in position between the facings during operation of the clutch.

8. A clutch plate comprising a disc, a pair of friction facings parallel to each other and to the peripheral portion of the disc and arranged on opposite sides thereof, separate cushion members arranged between the facings and in each of a plurality of openings in the peripheral portion to cushion the engagement of the clutch, said cushion members comprising oppositely curved portions, the portions curved in one direction being longer than the portions curved in the other direction with the ends of the longer curved portion engageable with the peripheral portion at the ends of the openings to hold said cushion members in position between the facings during operation of the clutch, yieldable means supporting one of said facings upon the disc in spaced relationship relative thereto and means limiting the spacing of the facing from the disc to a distance less than the thickness of the extended cushion members.

9. A clutch plate comprising a disc of relatively heavy sheet metal, a pair of friction facings parallel to each other and to the peripheral portion of the disc and arranged on opposite sides of the peripheral portion of the disc, tongues in the peripheral portion and offset from the plane thereof to space the facings from each other, and separate cushion members of relatively thin spring metal curved in opposite directions and arranged between the facings to cushion the engagement of the clutch.

10. A clutch plate comprising a disc of relatively heavy sheet metal, a pair of friction facings parallel to each other and to the peripheral portion of the disc and arranged on opposite sides thereof, tongues in the peripheral portion and offset from the plane thereof on both sides of said disc to space both facings from the disc, and separate cushion members of relatively thin spring metal curved in opposite directions and arranged between and engaging the facings to cushion both of said facings in the engagement of the clutch.

11. A clutch plate comprising a disc, a pair of friction facings parallel to each other and to the peripheral portion of the disc and arranged on opposite sides of the peripheral portion, tongues in the peripheral portion and offset from the plane thereof on both sides of said disc to space both facings from the disc, and separate cushion members curved in opposite directions and arranged between the facings and engageable therewith to cushion both of said facings in the engagement of the clutch, said disc being formed to hold the cushion members against lateral displacement during operation of the clutch.

12. A clutch plate comprising a disc having openings in the peripheral portion thereof, a pair of friction facings parallel to each other and to the peripheral portion of the disc and arranged on opposite sides thereof, a plurality of separate cushion members arranged in each opening in the peripheral portion to cushion the engagement of the clutch, tongues offset from the plane of the disc to space at least one of the facings from the disc, and means fastening a spaced facing to the tongues.

13. A clutch plate comprising a disc having openings in the peripheral portion thereof, a pair of friction facings parallel to each other and to the peripheral portion of the disc and arranged on opposite sides thereof, and a plurality of separate and structurally independent cushion members arranged in each one of said openings in the peripheral portion to cushion the engagement of the clutch.

14. A clutch plate comprising a disc having openings in the peripheral portion thereof, a pair of friction facings parallel to each other and to the peripheral portion of the disc and arranged on opposite sides thereof, and a plurality of separate cushion members arranged in each opening in the peripheral portion to cushion the engagement of the clutch.

15. A clutch plate comprising, a metal disc having openings therethrough arranged in annular array about the circumferential portion of the disc, annular friction facings located one on each side of said disc and in register with said openings, means securing said facings to said disc with at least one of said facings yieldably spaced away from the disc and both facings being parallel with the disc, and a plurality of separate relatively thin sheet metal cushion members located in said openings and engaging the opposed and inner sides of said facings, said cushion members each being formed with a cylindrical curvature about axes so arranged as to cause an increase in area of contact between cushions and facings in radial directions relative to the disc during compression of the clutch plate.

16. A clutch plate comprising, a metal disc having openings therethrough arranged in annular array about the circumferential portion of the disc, annular friction facings located one on each side of said disc and in register with said openings, tongue portions formed integrally with said disc and offset on at least one side thereof, means securing said facings to said disc with at least one of said facings secured only to said tongue portions of said disc, and a plurality of separate relatively thin sheet metal cushion members located in said openings and engaging the opposed and inner sides of said facings, said cushion members each being formed with a cylindrical curvature about axes so arranged as to cause an increase in area of contact between cushions and facings in radial directions relative to the disc during compression of the clutch plate.

17. A clutch plate comprising, a disc of relatively thick sheet metal, tongues offset from the plane of the peripheral portion of the disc when the clutch plate is uncompressed, a pair of friction facings at least one of which is fixed to said tongues arranged on opposite sides of the disc and parallel to each other and to the disc for full contact throughout engagement of the clutch, and structurally independent cushion members, of relatively thin spring metal, arranged between the facings for cushioning the engagement of the clutch.

18. A clutch plate comprising, a disc of relatively thick sheet metal, a pair of friction facings parallel to one another and to the peripheral portion of the disc and arranged on opposite sides thereof, means associated with said disc for supporting said friction facings yieldably away from the plane of the body of the disc, said means yielding during compression of the disc to permit the facings to be moved in parallel relationship relatively toward one another and structurally independent cushion members, of relatively thin spring metal, arranged between the facings for cushioning the engagement of the clutch, said disc being formed to hold the cushion members against lateral displacement and between the facings during operation of the clutch.

19. A clutch plate comprising, a disc having circumferentially spaced apart portions cut away adjacent the periphery thereof, a pair of friction facings, one on each side of the peripheral portion of said disc, means fastening certain of the disc portions between said cut-away portions to one of the facings, means fastening the remainder of said latter disc portions to the other of said facings, said fastening means and said disc portions being so arranged as to support the facings in parallel but spaced apart relationship to one another, and independent cushion springs interposed between the facings and located within the confines of the cut-away portions of the disc, whereby yieldingly to resist movement of the facings toward one another during compression of the clutch plate.

20. A clutch plate comprising, a disc of relatively heavy sheet metal, substantially rigid and relatively flat friction facings, one located on each side of the peripheral portion of said disc, means forming a part of said disc secured to said facings and so arranged relative to the body of the disc and the facings so as yieldingly to hold said facings in spaced apart parallel relationship to one another, said peripheral portion of said disc having portions cut away therefrom between said facings, and a plurality of structurally independent and relatively light spring cushion members located in said cut-away portions of said disc, and each bearing upon the opposed and adjacent inner surfaces of said facings, whereby yieldingly to resist movement of the facings relatively toward one another during clutch plate compression.

HAROLD V. REED.